US009666954B2

(12) United States Patent
Ko et al.

(10) Patent No.: US 9,666,954 B2
(45) Date of Patent: May 30, 2017

(54) ANTENNA DEVICE AND METHOD FOR OPERATING THE SAME

(71) Applicant: Samsung Electronics Co., Ltd., Suwon-si (KR)

(72) Inventors: Seung-Tae Ko, Bucheon-si (KR); Yoon-Geon Kim, Busan (KR); Kwang-Hyun Baek, Anseong-si (KR); Won-Bin Hong, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/859,105

(22) Filed: Sep. 18, 2015

(65) Prior Publication Data

US 2016/0087348 A1    Mar. 24, 2016

(30) Foreign Application Priority Data

Sep. 19, 2014 (KR) .................. 10-2014-0124998

(51) Int. Cl.
| | | |
|---|---|---|
| *H04B 7/00* | (2006.01) | |
| *H01Q 21/24* | (2006.01) | |
| *H01Q 3/24* | (2006.01) | |
| *H01Q 19/30* | (2006.01) | |
| *H01Q 19/32* | (2006.01) | |
| *H01Q 25/00* | (2006.01) | |
| *H04B 7/10* | (2017.01) | |

(Continued)

(52) U.S. Cl.
CPC .......... *H01Q 21/245* (2013.01); *H01Q 3/247* (2013.01); *H01Q 19/30* (2013.01); *H01Q 19/32* (2013.01); *H01Q 21/24* (2013.01); *H01Q 25/001* (2013.01); *H04B 7/10* (2013.01); *H01Q 9/0414* (2013.01); *H01Q 9/40* (2013.01)

(58) Field of Classification Search
CPC .......... H04B 1/401; H04B 7/10; H01Q 21/24; H01Q 19/30; H01Q 19/32; H01Q 25/001; H01Q 3/247
USPC .......................... 455/90.2; 343/836, 893, 848
See application file for complete search history.

(56) References Cited

U.S. PATENT DOCUMENTS

| | | | |
|---|---|---|---|
| 2005/0062661 A1* | 3/2005 | Zagiiloul ............... | H01Q 13/10 343/756 |
| 2011/0187576 A1* | 8/2011 | Salewski ................. | H01Q 1/38 342/14 |

(Continued)

OTHER PUBLICATIONS

International Search Report mailed Dec. 10, 2015 corresponding to International Patent Application No. PCT/KR2015/009136.

(Continued)

*Primary Examiner* — Ping Hsieh
(74) *Attorney, Agent, or Firm* — McAndrews, Held & Malloy, Ltd.

(57) ABSTRACT

Provided are an antenna device and a method for operating the antenna device. The antenna device includes a horizontal polarization antenna implemented on a first layer in a multi-layer circuit board and a vertical polarization antenna implemented on a plurality of second layers that are different from the first layer in the multi-layer circuit board, in which the horizontal polarization antenna and the vertical polarization antenna are stacked spaced apart from each other at an edge of a side of the multi-layer circuit board. The antenna device and the method for operating the antenna device may be implemented variously according to embodiments.

14 Claims, 14 Drawing Sheets

(51) Int. Cl.
　　　*H01Q 9/04*　　　(2006.01)
　　　*H01Q 9/40*　　　(2006.01)

(56) References Cited

U.S. PATENT DOCUMENTS

2013/0072136 A1* 3/2013 Besoli ................ H01Q 9/0435
　　　　　　　　　　　　　　　　　　　455/90.2
2013/0181882 A1　 7/2013 Shtrom
2013/0207869 A1　 8/2013 Han et al.
2013/0257672 A1　10/2013 Lu et al.
2014/0125541 A1* 5/2014 Hong .................... H01Q 1/243
　　　　　　　　　　　　　　　　　　　343/836

OTHER PUBLICATIONS

Written Opinion of the International Searching Authority mailed Dec. 10, 2015 corresponding to International Patent Application No. PCT/KR2015/009136.

* cited by examiner

ANTENNA DEVICE AND METHOD FOR OPERATING THE SAME

CROSS-REFERENCE TO RELATED APPLICATION(S)

This application claims priority under 35 U.S.C. §119(a) to Korean Patent Application Ser. No. 10-2014-0124998, which was filed in the Korean Intellectual Property Office on Sep. 19, 2014, the entire disclosure of which is hereby incorporated by reference.

TECHNICAL FIELD

Various embodiments of the present disclosure relate to an antenna device, for example an antenna device for millimeter wave (mmWave) communication and a method for operating the antenna device.

BACKGROUND

Wireless communication technologies have been implemented in various ways ranging from commercialized mobile communication network connection recently to a Wireless Local Area Network (WLAN) represented by Wireless Fidelity (Wi-Fi), Bluetooth, Near Field Communication (NFC), and so forth. Mobile communication service has evolved from voice-communication-oriented mobile communication services gradually to ultra-high-speed and high-volume services (e.g., a high-quality video streaming service). Next-generation mobile communication service to be commercialized in the future is expected to be provided in an ultra-high-speed frequency band over several tens of GHz.

To provide a stable service quality in a commercialized wireless communication network, a high gain and a broad beam coverage of an antenna device have to be satisfied. The next-generation mobile communication service may be provided in an ultra-high-frequency band over several tens of GHz (e.g., in a range of 30-300 GHz and with a resonance frequency wavelength of about 1-10 mm), and thus higher performance may be needed than with an antenna device used in a commercialized previous mobile communication service.

Generally, in a higher operating frequency band, an antenna device, for example, radio waves have stronger linearity and weaker diffraction, increasing a loss due to an obstacle (e.g., a building or a feature). To secure the stability of communication, the omni-directivity of the antenna device may be required, but for a high operating frequency band, it may be difficult to secure omni-directivity due to stronger linearity. Thus, an antenna device of an electronic device having a communication device operating in a high frequency band may have an array antenna structure including multiple radiators.

When millimeter wave (mmWave) communication is implemented, a wavelength is in a range of about 1-10 mm, and a radiator of an antenna device may have an electric length of about ¼ of a resonance frequency wavelength. An mmWave communication antenna device has an array of multiple radiators on a circuit board to secure omni-directivity, and also has a communication circuit chip on the circuit board, thus improving a loss in transmission between a communication chip and the radiators.

Although the omni-directivity is secured in this way, communication between a transmission side and a reception side may not be smooth if polarization (or polarized wave) components fail to be harmonized between the transmission side and the reception side. Thus, it is necessary to adjust and control polarization components of radio waves variously.

It may be relatively easy to secure a horizontal polarization component of radio waves in a radiator formed in a circuit board, but it may not be so for a vertical polarization component. For example, for a circuit board having a thickness of about 1 mm, there is a limitation in securing a grounding surface in a vertical direction, making it difficult to secure a polarization component (e.g., a vertical polarization component) in a thickness direction of the circuit board.

The above information is presented as background information only to assist with an understanding of the present disclosure. No determination has been made, and no assertion is made, as to whether any of the above might be applicable as prior art with regard to the present disclosure.

SUMMARY

The present disclosure has been made to at least partially solve, alleviate, or remove at least one of problems and/or disadvantages described above.

Accordingly, various embodiments of the present disclosure provide an antenna device capable of easily securing a polarization (or polarized wave) component (e.g., a vertical polarization component) in a thickness direction of a circuit board, while being mounted within a thickness range of the circuit board, and a method for operating the antenna device.

Moreover, various embodiments of the present disclosure provide an antenna device capable of generating polarization in various forms while having a radiator with a combination of a horizontal polarization antenna and a vertical polarization antenna therein to secure omni-directivity, and a method for operating the antenna device.

Furthermore, various embodiments of the present disclosure provide an antenna device capable of maintaining a stable transmission and reception sensitivity in millimeter wave communication by generating polarization in various forms.

Other objects to be provided in the present disclosure may be understood by embodiments described below.

According to an aspect of the present disclosure, there is provided an antenna device including a horizontal polarization antenna implemented on a first layer in a multi-layer circuit board and a vertical polarization antenna implemented on a plurality of second layers that are different from the first layer in the multi-layer circuit board, in which the horizontal polarization antenna and the vertical polarization antenna are stacked spaced apart from each other at an edge of a side of the multi-layer circuit board.

The vertical polarization antenna may be implemented using a 0-degree mode resonator in which a radiation patch formed on a surface of one of the second layers and a ground patch formed on another layer are connected through a via hole.

According to another aspect of the present disclosure, there is provided a method for operating an antenna device comprising a combination of a horizontal polarization antenna and a vertical polarization antenna, the method including a discovery operation of discovering a peripheral device, a selection operation of selecting a peripheral device to which communication connection is to be made from among discovered peripheral devices, a scan operation of attempting communication with the selected peripheral device while changing polarization using the horizontal polarization antenna and the vertical polarization antenna, an evaluation operation of evaluating a signal-to-noise ratio corresponding to polarization in the communication with the selected peripheral device, and an establishment operation of selecting optimal polarization from the evaluated signal-to-noise ratio and establishing communication.

Other aspects, advantages, and salient features of the disclosure will become apparent to those skilled in the art from the following detailed description, which, taken in conjunction with the annexed drawings, discloses an exemplary embodiment of the disclosure.

BRIEF DESCRIPTION OF THE DRAWINGS

The above and other aspects, features and advantages of a certain embodiment of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
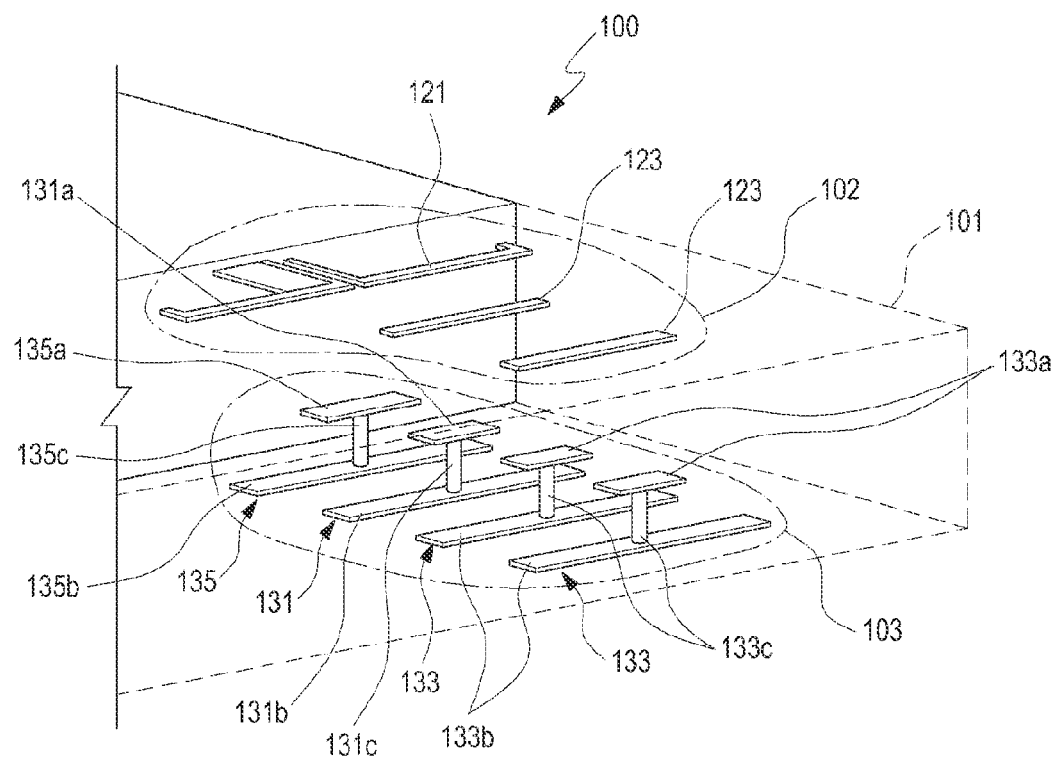
FIG. 1 illustrates an antenna device according to one of various embodiments of the present disclosure.

Various embodiments of the present disclosure may be changed variously and may have a variety of embodiments, such that particular embodiments have been illustrated in the drawings and a related detailed description thereof will be provided below. However, this is not intended to limit the various embodiments to particular embodiments, and should be understood that all changes, equivalents, or substitutes included in the spirit and technical scope of the present disclosure are included in the scope of the present disclosure.

Although ordinal numbers such as "first", "second", and so forth will be used to describe various components of the present disclosure, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

Relative terms used based on illustration in the drawings, such as a "front side", a "rear side", a "top surface", a "bottom surface", and the like, may be replaced with ordinal numbers such as "first", "second", and the like. The order of the ordinal numbers such as "first", "second", and the like is a mentioned order or an arbitrarily set order, and may be changed as needed.

The terminology used herein is for the purpose of describing an embodiment only and is not intended to be limiting of an embodiment. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

Unless defined otherwise, all terms used herein have the same meanings as generally understood by those having ordinary knowledge in the technical field to which the present disclosure pertains. Terms generally used and defined in dictionaries should be interpreted as having meanings consistent with meanings construed in the context of the related art, and should not be interpreted as having ideal or excessively formal meanings unless defined explicitly in this application.

In various embodiments of the present disclosure, an electronic device may be an arbitrary device having a touch panel and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a Television (TV), a vehicle head unit, a laptop computer, a tablet computer, a Personal Media Player (PMP), a Personal Digital Assistant (PDA), or the like. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. The network may be, but not limited to, a mobile or cellular communication network, a Local Area Network (LAN), a Wireless Local Area Network (WLAN), a Wide Area Network (WAN), Internet, or a Small Area Network (SAN).

Figure 2:
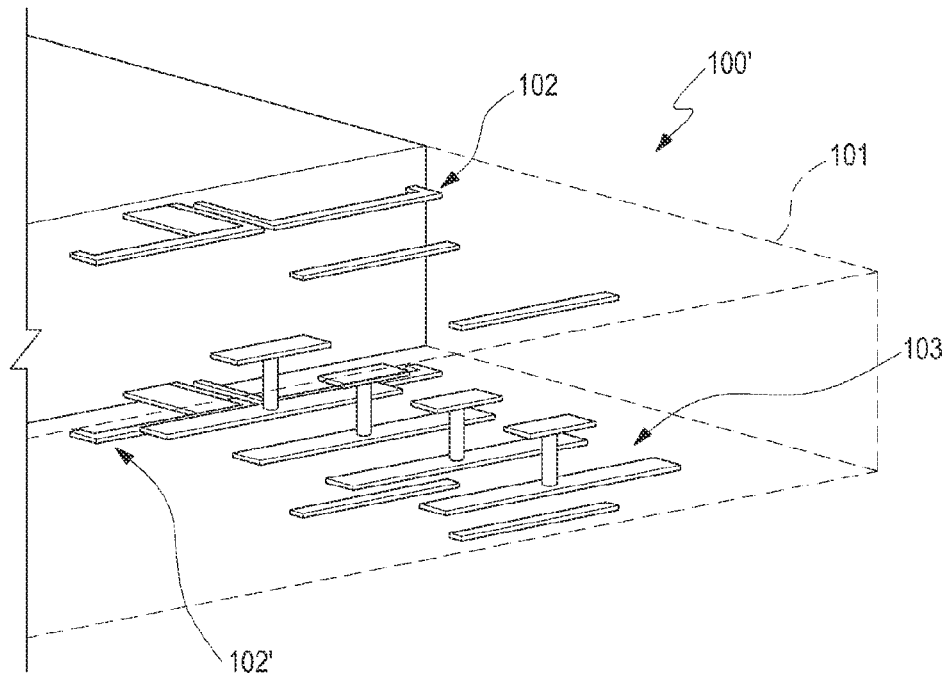
FIG. 2 illustrates an antenna device according to another one of various embodiments of the present disclosure.

FIG. 1 is a perspective view of an antenna device 100 according to one of various embodiments of the present disclosure. FIG. 2 is a perspective view of an antenna device 100' according to another one of various embodiments of the present disclosure.

Referring to FIGS. 1 and 2, antenna devices 100 and 100' according to various embodiments of the present disclosure may include at least one horizontal polarization (or polarized wave) antennas 102 and/or 102' implemented in a multi-layer circuit board 101 and a vertical polarization antenna 103 stacked spaced apart from the horizontal polarization antennas 102 and 102'. When a plurality of the horizontal polarization antennas 102 and 102' are disposed, the vertical polarization antenna 103 may be disposed between the plurality of horizontal polarization antennas 102 and 102'. The vertical polarization antenna 103 disposed between the plurality of horizontal polarization antennas 102 and 102' may function as a shielding member that independently radiates radio waves to the plurality of horizontal polarization antennas 102 and 102' and separates the plurality of horizontal polarization antennas 102 and 102' from each other. The horizontal polarization antennas 102 and 102' and the vertical polarization antenna 103 may be disposed at an edge or a side of the multi-layer circuit board 101. It should be noted that when detailed embodiments of the present disclosure are described, layers of the multi-layer circuit board 101 have not been separately shown for brevity of illustration.

The structure of the horizontal polarization antennas 102 and 102' will be described in more detail with reference to FIG. 3.

Figure 3:
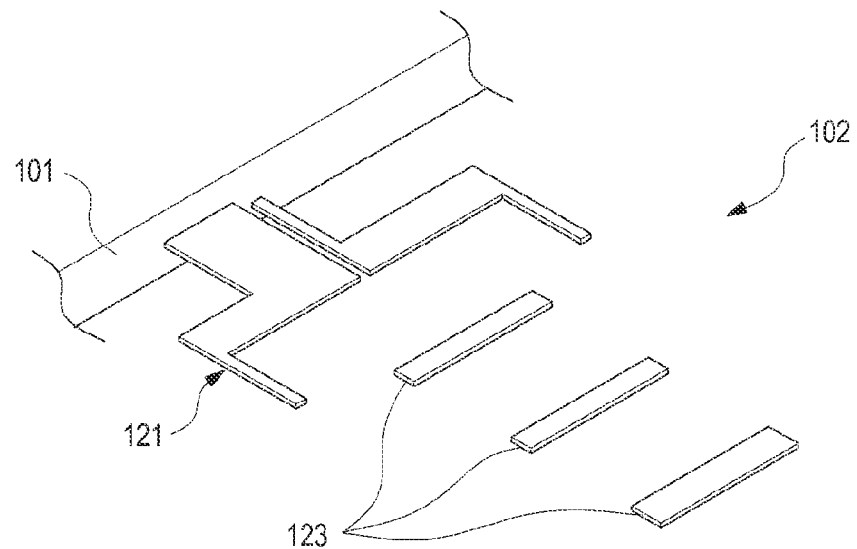
FIG. 3 illustrates a horizontal polarization antenna of an antenna device according to various embodiments of the present disclosure.

FIG. 3 illustrates the horizontal polarization antenna 102 of the antenna devices 100 (of FIG. 1) and 100' (of FIG. 2) according to various embodiments of the present disclosure.

The horizontal polarization antenna 102 is implemented on a first layer of the multi-layer circuit board 101, and may have a Yagi-Uda antenna structure. The horizontal polarization antenna 102 generates polarization (e.g., horizontal polarization) that is parallel to a surface of the multi-layer circuit board 101. The horizontal polarization antenna 102 may be implemented by arranging a radiation member 121 and a plurality of induction members 123 along a direction in which radio waves are to be radiated. The radiation member 121 and the plurality of induction members 123 may include a conductor pattern formed on a surface of dielectric layers forming the multi-layer circuit board 101.

Figure 4:
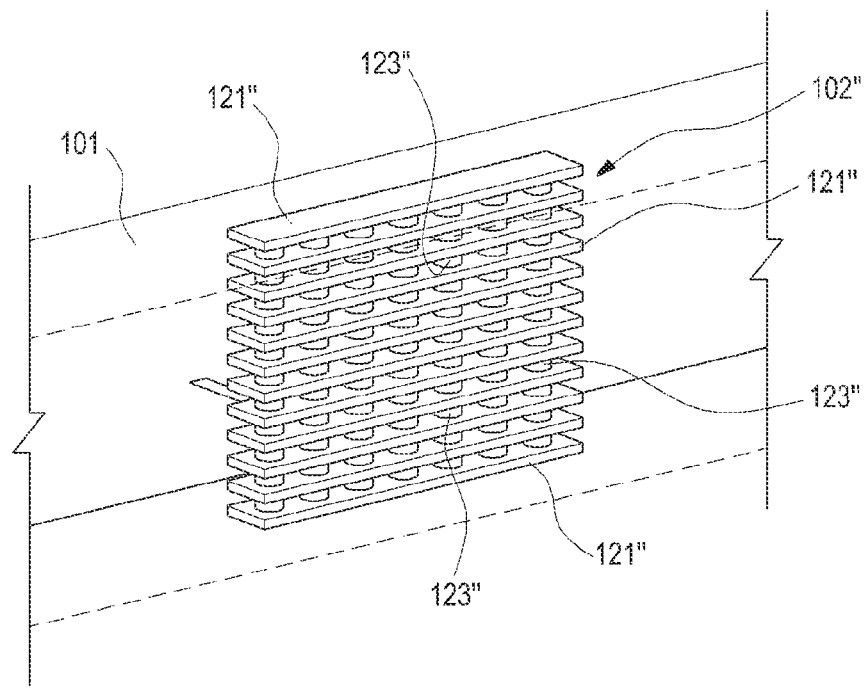
FIG. 4 illustrates a modified example of a horizontal polarization antenna of an antenna device according to various embodiments of the present disclosure.

FIG. 4 illustrates a modified example of a horizontal polarization antenna of an antenna device (such as, e.g., the antenna devices 100, 100' of FIG. 1 and FIG. 2) according to various embodiments of the present disclosure.

According to various embodiments of the present disclosure, a horizontal polarization antenna 102" of the antenna devices 100 and 100' (of FIG. 1 and FIG. 2) may be implemented as a radiator having a mesh grid structure on the multi-layer circuit board 101. For example, the horizontal polarization antenna 102" may be formed by arranging a plurality of patches 121" joined by via holes 123". The patches 121" are arranged on each layer of the multi-layer circuit board 101 and the patches 121" on adjacent layers are connected to one another to form the horizontal polarization antenna 102". A resonance frequency of the horizontal polarization antenna 102" may be determined based on a feeding position of the horizontal polarization antenna 102" and a length of the patches 121".

According to various embodiments of the present disclosure, it may be easily understood by those of ordinary skill in the art that the horizontal polarization antennas 102, 102', and 102" of the antenna devices 100 and 100' may also be implemented with other antenna structures, such as, for example, a dipole antenna structure.

Figure 5:
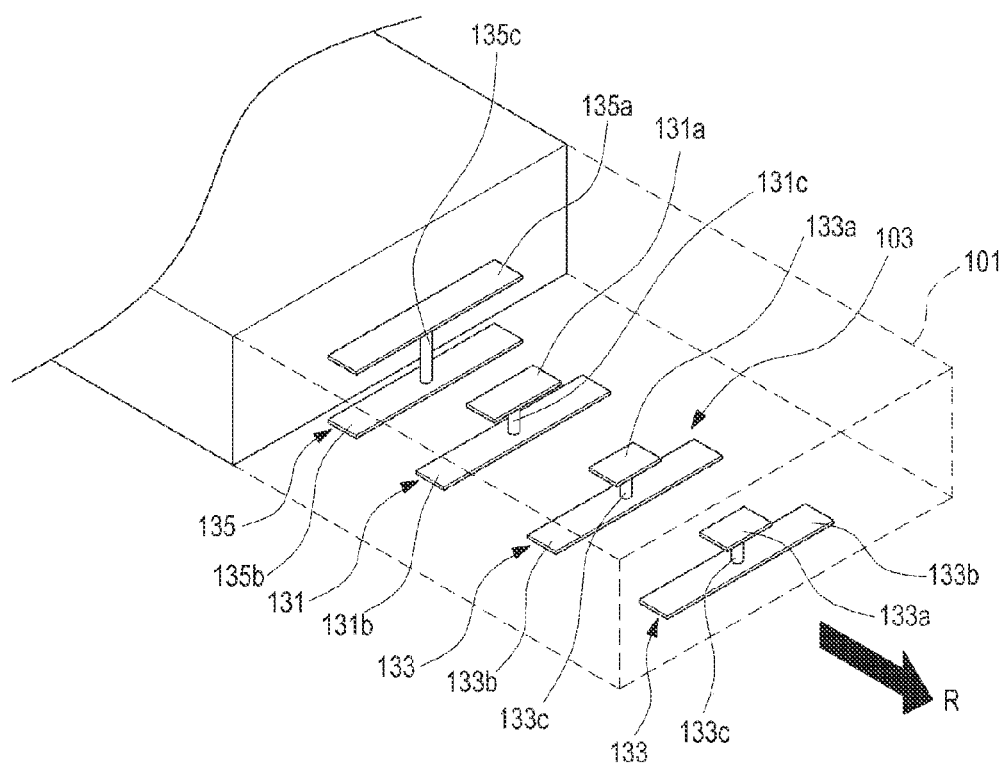
FIG. 5 illustrates a vertical polarization antenna of an antenna device according to various embodiments of the present disclosure.

FIG. 5 illustrates the vertical polarization antenna 103 of the antenna device 100 according to various embodiments of the present disclosure.

Referring to FIG. 5, the vertical polarization antenna 103 may be implemented on a plurality of second layers that are different from the first layer (as discussed above) of the multi-layer circuit board 101. On the second layers, a radiation patch 131a, at least one induction patches 133a, and a reflection patch 135a may be disposed, and a plurality of ground patches 131b, 133b, and 135b extending in a direction, may be arranged on a surface of any one of the second layers. The ground patches 131b, 133b, and 135b may be arranged perpendicularly to a direction in which the vertical polarization antenna 103 extend. For example, the ground patches 131b, 133b, and 135b may be arranged along a direction R in which the vertical polarization antenna 103 radiates radio waves, and may extend perpendicularly to the direction R. The ground patches 131b, 133b, and 135b are arranged corresponding to the radiation patch 131a, the induction patches 133a, and the reflection patch 135a to form the vertical polarization antenna 103. The radiation patch 131a, the induction patches 133a, and the reflection patch 135a may be connected to the corresponding ground patches 131b, 133b, and 135b through via holes 131c, 133c, and 135c, respectively. The ground patches 131b, 133b, and 135b may extend longer than the corresponding radiation patch 131a, the corresponding induction patches 133a, and the corresponding reflection patch 135a, and may disposed in parallel with the corresponding radiation patch 131a, the corresponding induction patches 133a, and the corresponding reflection patch 135a.

The radiation patch 131a may be connected with the corresponding ground patch 131b through the via hole 131c to form a radiator, or a 0-degree mode resonator 131. In this way, an electric field may be formed between the radiation patch 131a and the ground patch 131b of the 0-degree mode resonator 131. The electric field formed by the 0-degree mode resonator 131 may be formed perpendicularly to a surface of the multi-layer circuit board 101. Thus, radio waves radiated by the 0-degree mode resonator 131 may have a vertical polarization element, and the induction patch 133a and the reflection patch 135a may strengthen the vertical polarization component of the radiated radio waves and improve directivity. According to the number of induction patches 133a, the directivity of the vertical polarization antenna 103 may be further strengthened. The resonance frequency of the vertical polarization antenna 103 may be determined by an area of the radiation patch 131a. For example, by adjusting the length of the radiation patch 131a while maintaining the width of the radiation patch 131a, the resonance frequency of the vertical polarization antenna 103 may be adjusted.

The induction patches 133a may be connected to the corresponding ground patches 133b through the via holes 133c to form inductors 133. The inductors 133 may reinforce the directivity of radio waves radiated from the 0-degree mode resonator 131. The induction patches 133a are arranged in the direction R in which radio waves are to be radiated from the radiation patch 131a. The radiation patch 131a and the induction patches 133a may be disposed in a position spaced apart by a predetermined proportion, for example, ⅓, of a resonance frequency wavelength of the antenna devices 100 and 100'. The induction patches 133a extend in parallel with the radiation patch 131a and a length thereof may be shorter than the radiation patch 131a in some embodiments. Moreover, a height between the induction patches 133a and their corresponding ground patch 133b may be equal to or lower than a height between the radiation patch 131a and its corresponding ground patch 131b (e.g., a height of the 0-degree mode resonator 131). For example, the radiation patch 131a and its corresponding ground patch 131b may be disposed between a number of layers of the multi-layer circuit board 101, and the induction patches 133a and their corresponding ground patches 133b may be disposed between a smaller number of layers of the multi-layer circuit board 101. In an embodiment, an interval between the radiation patch 131a and its corresponding ground patch 131b may be set to about 0.3 mm. Since the induction patches 133a are positioned lower than the radiation patch 131a, a surface current may be left on the induction patches 133a by the radio waves radiated from the radiation patch 131a. In this way, the vertical polarization antenna 103 reinforces the vertical polarization component and further improves directivity.

The reflection patch 135a is connected to its corresponding ground patch 135b through the via hole 135c to form a reflector 135. The reflector 135 reflects some of the radio waves radiated from the radiator, for example, the 0-degree mode resonator 131 in a direction in which at least one of the inductors 133 is arranged. The reflection patch 135a may be positioned in a reverse direction to the direction R in which the radio waves are to be radiated from the radiation patch 131a. The reflection patch 135a extends in parallel with the radiation patch 131a and its length may be longer than the radiation patch 131a. A height between the reflection patch 135a and its corresponding ground patch 135b may be higher than a height between the radiation patch 131a and its corresponding ground patch 131b. For example, the radiation patch 131a and its corresponding ground patch 131b may be disposed having a plurality of layers of the layers of the multi-layer circuit board 101 therebetween, and the reflection patch 135a and its corresponding ground patch 135b may be disposed having a larger number of layers therebetween. As the reflection patch 135a is formed longer than the radiation patch 131a and is disposed higher than the radiation patch 131a, some of the radio waves radiated from the radiation patch 131a may be reflected in the direction R in which the radio waves are to be radiated by the radiation patch 131a. For example, although some of the radio waves radiated from the radiation patch 131a may be radiated in a reverse direction with respect to the direction R, they may be reflected by the reflection patch 135a.

The reflection patch 135a may be disposed in a position spaced apart from the radiation patch 131a by a predetermined proportion, for example, ¼, of a resonance frequency wavelength of the antenna devices 100 and 100'. The radio waves radiated from the radiation patch 131a toward the induction patches 133a and the radio waves radiated from the radiation patch 131a toward the reflection patch 135a may have a phase difference, for example, of 180°. By setting an interval between the reflection patch 135a and the radiation patch 131a to ¼ of the resonance frequency wavelength, the radio waves reflected by the reflection patch 135a may have the same phase as the radio waves radiated from the radiation patch 131a toward the induction patches 133a. Thus, the vertical polarization component and directivity of the vertical polarization antenna 103 may be further reinforced.

Figure 6:
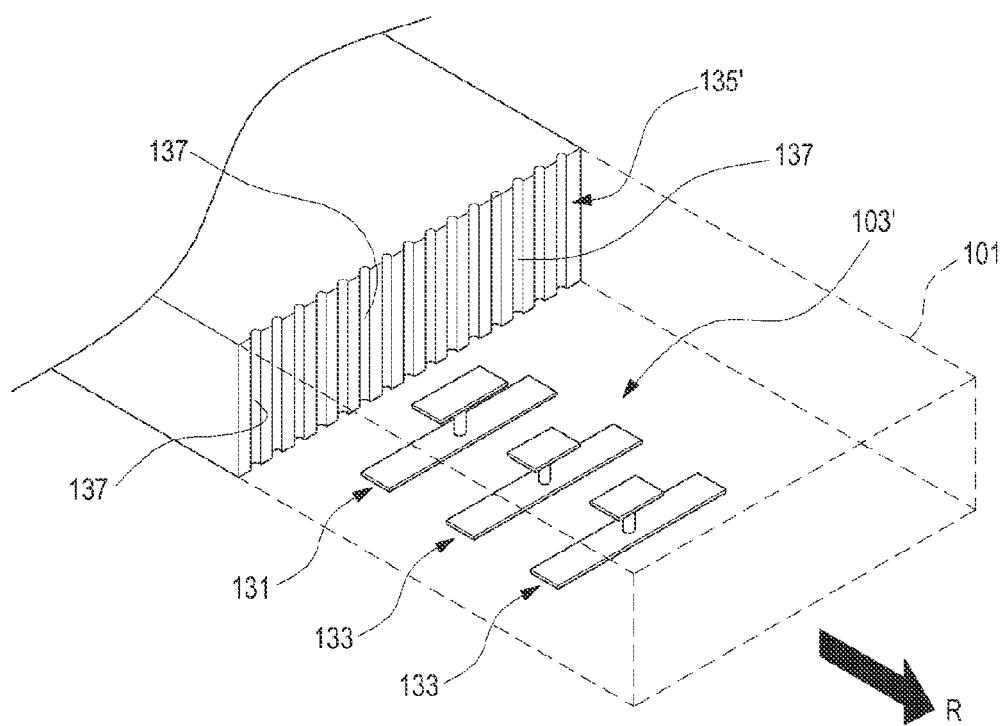
FIG. 6 illustrates a modified example of a vertical polarization antenna of an antenna device according to various embodiments of the present disclosure.

FIG. 6 illustrates a modified example of a vertical polarization antenna 103' of the antenna devices 100 (of FIG. 1) and 100' (of FIG. 2) according to various embodiments of the present disclosure.

Referring to FIG. 6, when the vertical polarization antenna 103' of the antenna devices 100 and 100' is implemented, the reflector 135 according to the previous embodiment may be replaced with a reflection surface 135' having a via array structure. When the current embodiment is described, components that are the same as those of the previous embodiment or that may be easily understood from the previous embodiment will be referred to as the same reference numerals or will be omitted and a detailed description thereof will also be omitted.

The vertical polarization antenna 103' may include the 0-degree mode resonator 131, the inductors 133, and the reflection surface 135'. The reflection surface 135' may be formed by arranging multiple via holes 137 passing through both surfaces of the multi-layer circuit board 101 in perpendicular to the direction R in which radio waves are to be radiated. The arrangement of the via holes 137, for example, the reflection surface 135' may reflect the radio waves radiated by the 0-degree mode resonator 131. When the reflection surface 135' is formed, a height of the reflection surface 135' (a thickness of the multi-layer circuit board 101) and a length of the reflection surface 135' (a length in a direction in which the radiation patch 131a extends) may be longer than those of the 0-degree mode resonator 131. Thus, radiation performance of the reflection surface 135' may be further stabilized. The reflection surface 135' may be disposed in a position spaced apart from the 0-degree mode resonator 131 by a predetermined proportion, for example, ¼, of the resonance frequency wavelength of the antenna devices 100 and 100'.

Figure 7:
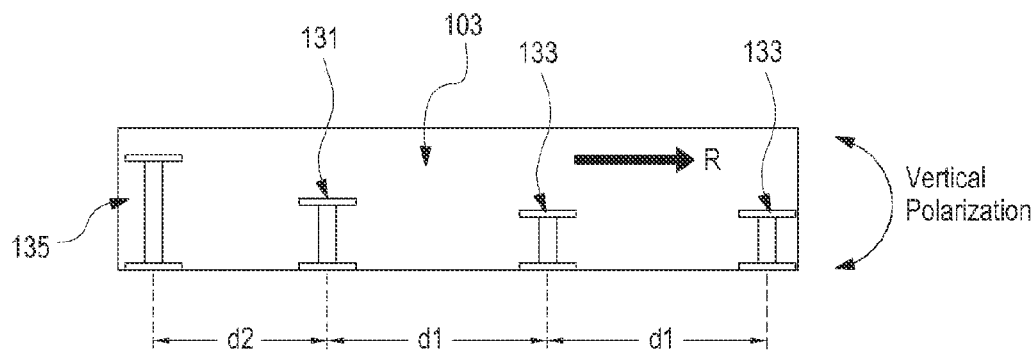
FIG. 7 is a diagram for describing operations of a vertical polarization antenna of an antenna device according to various embodiments of the present disclosure.
Figure 8:
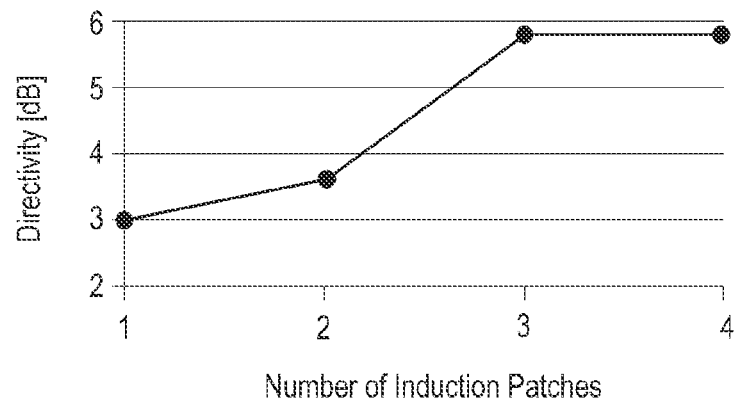
FIG. 8 is a diagram showing measurement of directivity with respect to the number of induction patches in a vertical polarization antenna of an antenna device according to various embodiments of the present disclosure.
Figure 9:
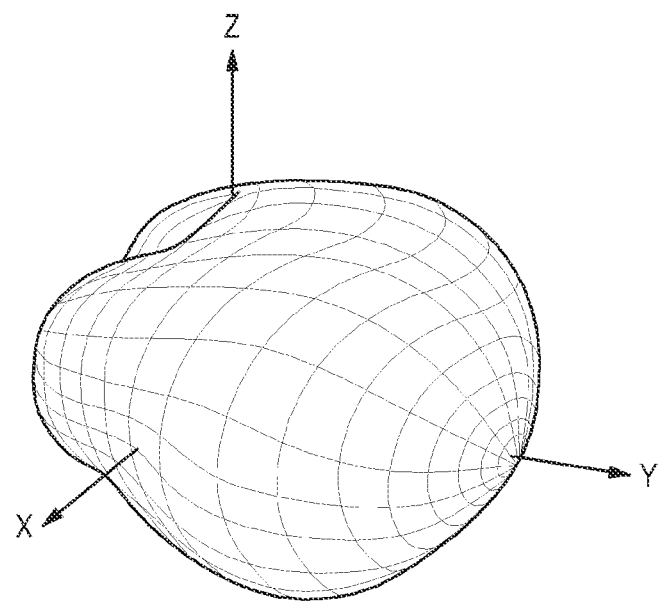
FIG. 9 is a diagram showing measurement of radiation characteristics of a vertical polarization antenna of an antenna device according to various embodiments of the present disclosure.

FIG. 7 is a diagram for describing an operation of a vertical polarization antenna of the antenna devices 100 and 100' according to various embodiments of the present disclosure. FIG. 8 is a diagram showing measurement of directivity with respect to the number of induction patches in a vertical polarization antenna of the antenna devices 100 and 100'. FIG. 9 is a diagram showing measurement of radiation characteristics of a vertical polarization antenna of the antenna devices 100 and 100' according to various embodiments of the present disclosure.

In the antenna devices 100 and 100' according to various embodiments of the present disclosure, the 0-degree mode resonator 131 radiates radio waves having a vertical polarization component. The inductor(s) 133 may be disposed in a position spaced apart by a distance d1 that is, for example, ⅓ of the resonance frequency wavelength of the antenna devices 100 and 100' (e.g., the resonance frequency wavelength of the vertical polarization antennas 103 and 103') from the 0-degree mode resonator 131 or another adjacent inductor 133. The reflectors 135 and 135' may be disposed in a position spaced apart by a distance d2 that is, for example, ¼ of the resonance frequency wavelength of the antenna devices 100 and 100' (e.g., the resonance frequency wavelength of the vertical polarization antennas 103 and 103') from the 0-degree mode resonator 131. By disposing the inductors 133 and the reflectors 135 and 135' in this way, the vertical polarization antennas 103 and 103' may reinforce a vertical polarization component and directivity.

Referring to FIG. 8, depending on the number of inductors 133 provided in the vertical polarization antennas 103 and 103', the directivity of the vertical polarization antennas 103 and 103' may be improved. However, the directivity of the vertical polarization antennas 103 and 103' may not be completely proportional to the number of inductors 133 and in the illustrated embodiment, it can be seen that by disposing three inductors 133, the degree of improvement of the directivity approximately reaches a threshold value.

Referring to FIG. 9, the radiation direction R of the vertical polarization antennas 103 and 103' may be oriented along a Y-axis when the 0-degree mode resonator 131 is positioned at the original point of a three-axis (X,Y,Z) orthogonal coordinate system, and radio waves radiated from the vertical polarization antennas 103 and 103' may radiate radio waves of a vertical polarization component.

Figure 10:
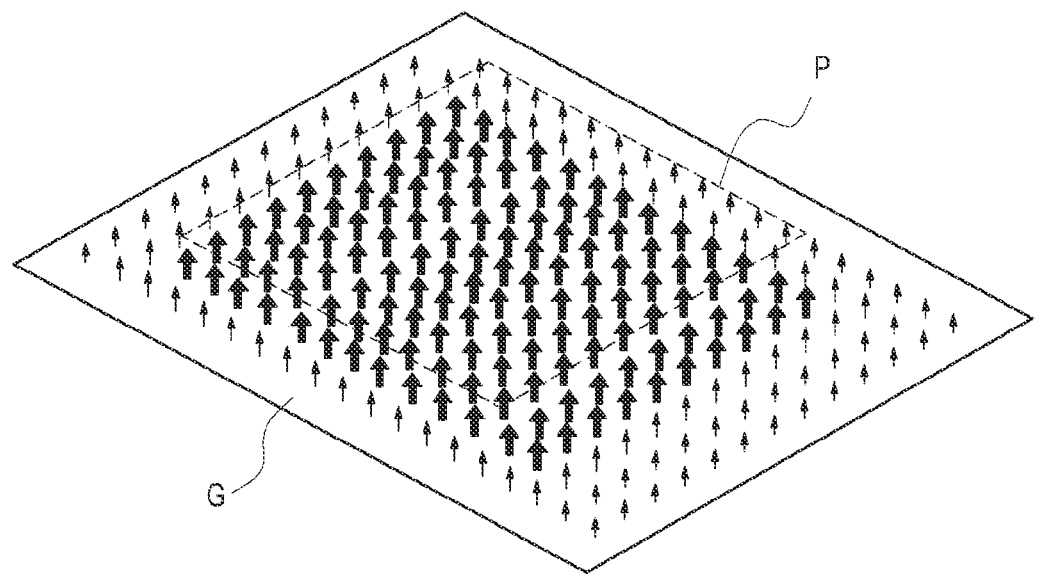
FIG. 10 is a diagram showing electric field characteristics of a typical 0-degree mode resonator.
Figure 11:
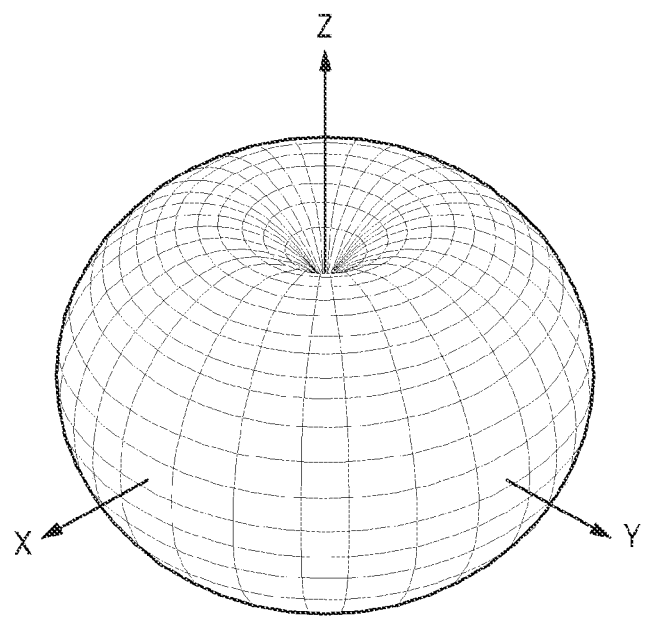
FIG. 11 is a diagram showing radiation characteristics of a typical 0-degree mode resonator.

FIG. 10 is a diagram showing electric field characteristics of an exemplary 0-degree mode resonator, and FIG. 11 is a diagram showing radiation characteristics of an exemplary 0-degree mode resonator.

Referring to FIGS. 10 and 11, a 0-degree mode resonator (e.g., the 0-degree mode resonator 131 of FIG. 5) in which a ground G and a square radiation patch P are connected through a via hole may form an omni-directional radiation pattern. The vertical polarization antennas 103 and 103' of the antenna devices 100 and 100' according to various embodiments of the present disclosure include a radiation patch 131a in a form extending in a direction, and the radiation patch 131a in this form may form a radiation pattern which has directivity along the Y direction and is symmetric with respect to a Z axis (or an X axis). Herein, when the vertical polarization antennas 103 and 103' are implemented, the antenna devices 100 and 100' according to various embodiments of the present disclosure include the inductors 133 and the reflector 135 (or the reflection surface 135'), thus forming a radiation pattern in a form as illustrated in FIG. 9 (e.g., in a form having a vertical polarization component and directivity).

Figure 12:
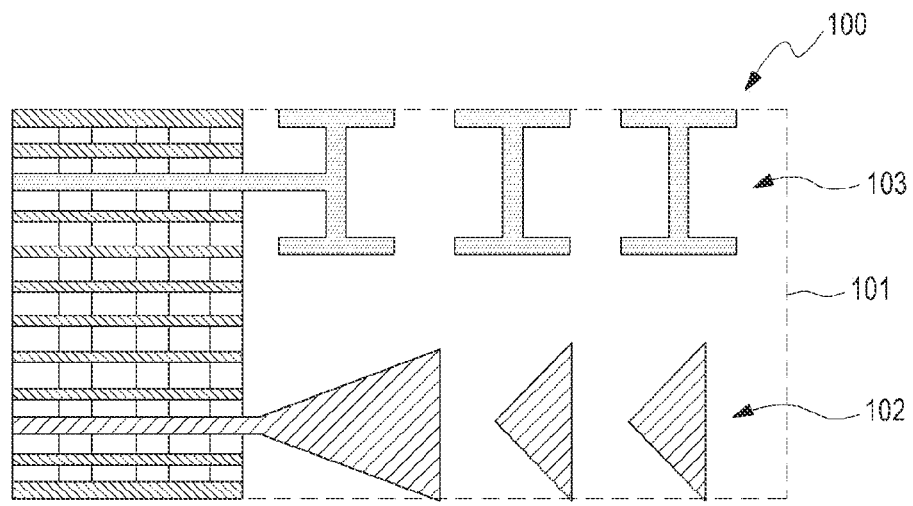
FIG. 12 is a structural diagram of an antenna device according to one of various embodiments of the present disclosure.
Figure 13:
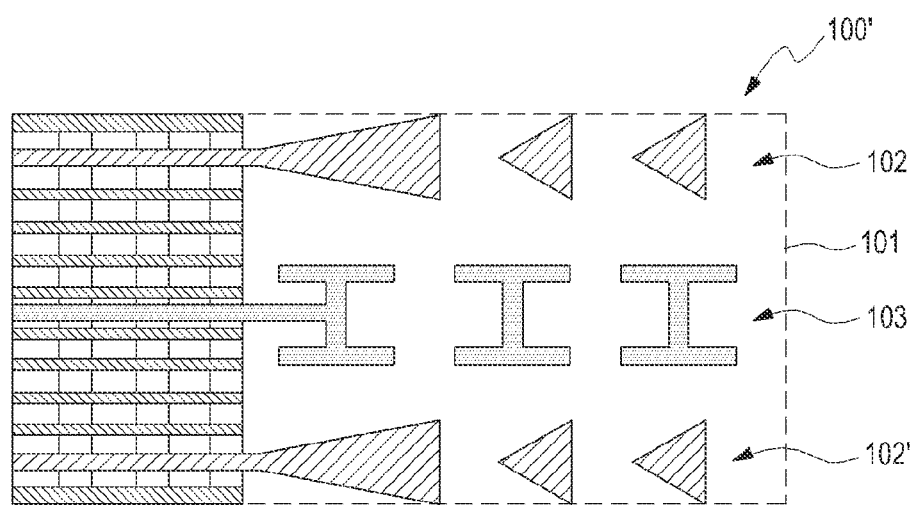
FIG. 13 is a structural diagram of an antenna device according to another one of various embodiments of the present disclosure.

FIG. 12 is a structural diagram of the antenna device 100 according to one of various embodiments of the present disclosure, and FIG. 13 is a structural diagram of the antenna device 100' according to another one of various embodiments of the present disclosure.

Referring to FIG. 12, in the antenna device 100 according to one of various embodiments of the present disclosure, the above-described vertical polarization antenna 103 including the 0-degree mode resonator 131 and the horizontal polarization antenna 102 having the Yagi-Uda antenna structure may be disposed in adjacent to an edge of a side of the multi-layer circuit board 101. The horizontal polarization antenna 102 and the vertical polarization antenna 103 have different characteristics and thus radiate radio waves that do not interfere with each other, and if feed signals are applied to the horizontal polarization antenna 102 and the vertical polarization antenna 103 at the same time, circular polarization may be generated according to a phase difference between the feed signals. If the horizontal polarization antenna 102 and the vertical polarization antenna 103 are provided with in-phase feed signals, the antenna device 100 may generate polarization having an inclined polarization surface with respect to vertical polarization or horizontal polarization, as will be described in more detail below.

Referring to FIG. 13, the antenna device 100' according to another one of various embodiments of the present disclosure may have the vertical polarization antenna 103 disposed between the plurality of horizontal polarization antennas 102 and 102'. The horizontal polarization antennas 102 and 102' may be provided as the Yagi-Uda antenna structure, and the vertical polarization antenna 103 may include the above-described 0-degree mode resonator 131. The vertical polarization antenna 103 may have independent operating characteristics with respect to the horizontal polarization antennas 102 and 102', and may function as shielding members for separating the horizontal polarization antennas 102 and 102' from each other. According to feed signals respectively applied to the horizontal polarization antennas 102 and 102' and the vertical polarization antennas 103, the antenna device 100' may generate vertical polarization, horizontal polarization, circular polarization, or inclined polarization.

Figure 14:
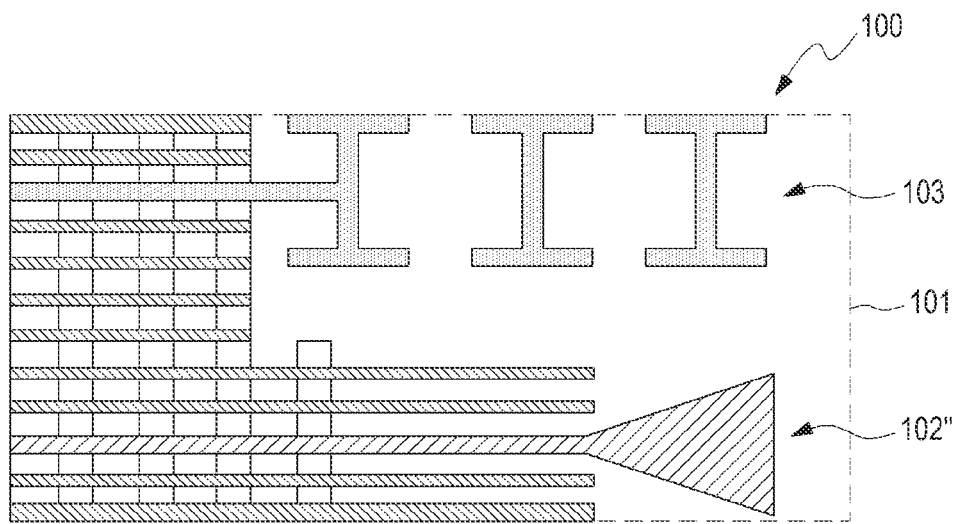
FIG. 14 is a structural diagram of a modified example of an antenna device according to one of various embodiments of the present disclosure.
Figure 15:
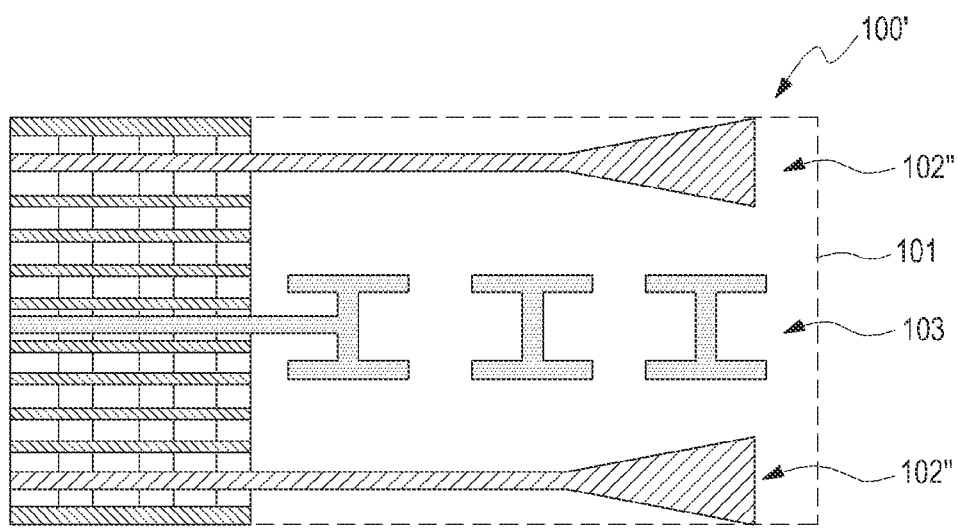
FIG. 15 is a structural diagram of a modified example of an antenna device according to another one of various embodiments of the present disclosure.

FIG. 14 is a structural diagram of a modified example of the antenna device 100 according to one of various embodiments of the present disclosure, and FIG. 15 is a structural diagram of a modified example of the antenna device 100' according to another one of various embodiments of the present disclosure.

The antenna devices 100 and 100' illustrated in FIGS. 14 and 15 may implement the horizontal polarization antenna 102' as a radiator having a mesh-grid structure. The horizontal polarization antenna 102' may be implemented as the radiator illustrated in FIG. 4. The antenna devices 100 and 100' illustrated in FIGS. 14 and 15 may generate horizontal polarization, vertical polarization, circular polarization, and inclined polarization according to whether feed signals are applied to the horizontal polarization antenna 102' and the vertical polarization antenna 103 and a phase difference between the feed signals.

Figure 16:
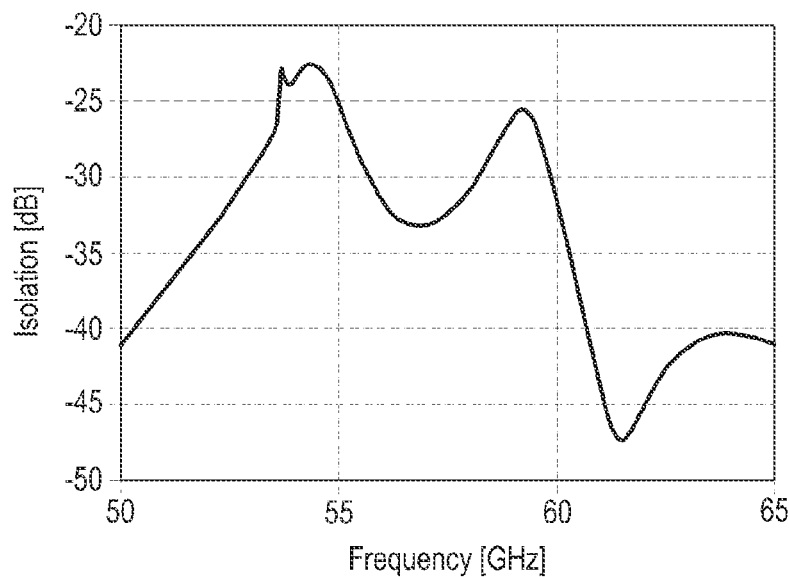
FIG. 16 is a diagram showing measurement of a degree of isolation or an isolation between a vertical polarization antenna and a horizontal polarization antenna of an antenna device according to one of various embodiments of the present disclosure.
Figure 17:
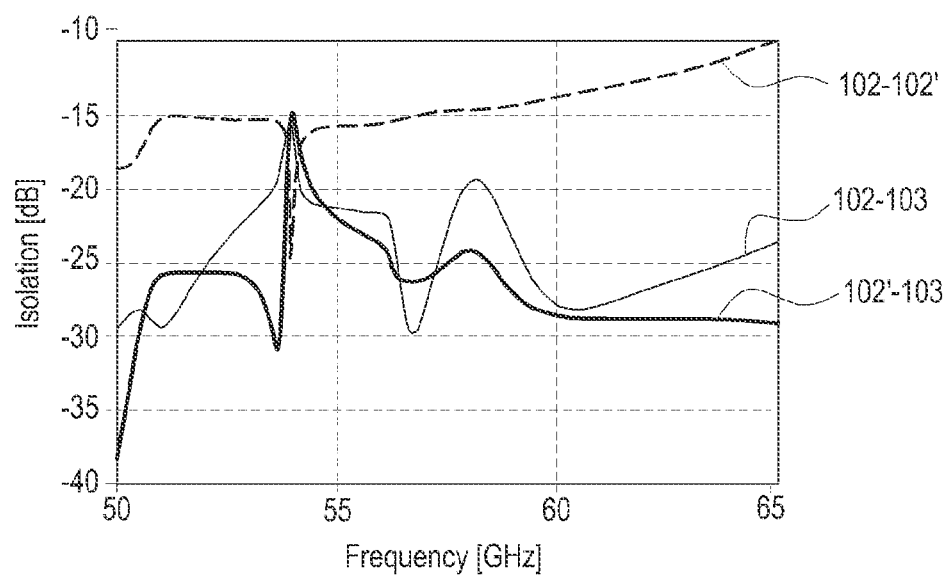
FIG. 17 is a diagram showing measurement of an isolation between a vertical polarization antenna and a horizontal polarization antenna of an antenna device according to another one of various embodiments of the present disclosure.

FIG. 16 is a diagram showing measurement of a degree of isolation or an isolation between the vertical polarization antenna 103 and the horizontal polarization antenna 102 of the antenna device 100 according to one of various embodiments of the present disclosure. FIG. 17 is a diagram showing measurement of an isolation between the vertical polarization antennas 103 and 103' and the horizontal polarization antenna 102 of the antenna device 100' according to another one of various embodiments of the present disclosure.

FIG. 16 illustrates measurement results of an isolation between the horizontal polarization antenna 102 and the vertical polarization antenna 103 in the antenna device 100 implemented with one horizontal polarization antenna 102 and one vertical polarization antenna 103 according to various embodiments of the present disclosure. As illustrated in FIG. 16, when the antenna device according to various embodiments of the present disclosure is implemented with one horizontal polarization antenna 102 and one vertical polarization antenna 103, an isolation of about −23 dB or more may be secured between the horizontal polariziton antenna 102 and the vertical polarization antenna 103 in a measurement frequency band (e.g., 50-65 GHz).

FIG. 17 illustrates a measurement result of an isolation between the horizontal polarization antennas 102 and 102' and the vertical polarization antenna 103 in the antenna device 100' implemented with a pair of horizontal polarization antennas 102 and 102' and the vertical polarization antenna 103 according to various embodiments of the present disclosure. A graph indicated by 102-102' indicates measurement of an isolation between the horizontal polarization antennas 102 and 102' shown in FIG. 2, from which it can be seen that at least −10 dB and a maximum of −25 dB may be secured in a measurement frequency band (e.g., 50-65 GHz). An isolation between the first horizontal polarization antenna 102 among the horizontal polarization antennas illustrated in FIG. 2 and the vertical polarization antenna 103 is indicated by a graph 102-103, and an isolation between the second horizontal polarization antenna 102' and the vertical polarization antenna 103 is indicated by a graph 102'-103. It can be seen that the degrees of isolation between the horizontal polarization antennas 102 and 102' and the vertical polarization antenna 103 may secure an isolation of at least −15 dB over the entire measurement frequency band.

Figure 18:
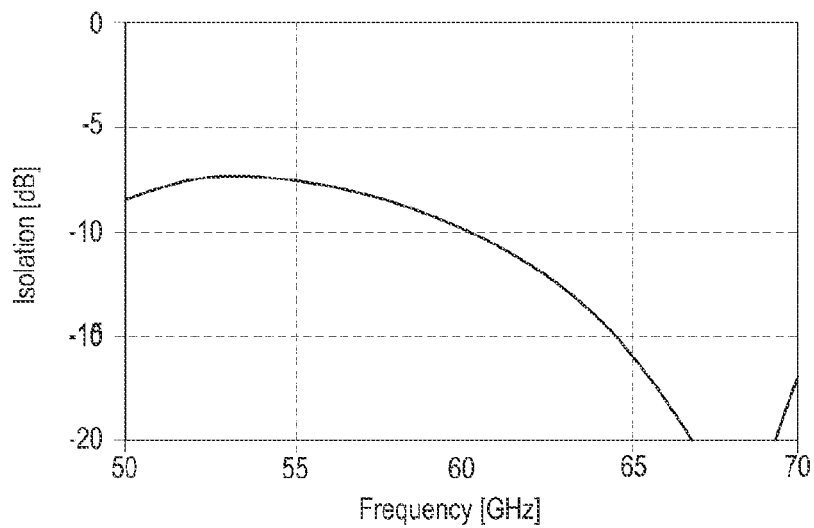
FIG. 18 is a diagram showing measurement of an isolation between a plurality of horizontal polarization antennas arranged on one circuit board.

FIG. 18 is a diagram showing measurement of an isolation between a plurality of horizontal polarization antennas when the plurality of horizontal polarization antennas are disposed on one circuit board.

Typically, when an antenna device for mmWave communication is implemented, it may be easier to mount a horizontal polarization antenna in a circuit board than to mount a vertical polarization antenna in the circuit board. When a plurality of horizontal polarization antennas are stacked in the circuit board, the performance of the antenna device may be degraded due to interference between the horizontal polarization antennas. Referring to FIG. 18, it can be seen that when a plurality of horizontal polarization antennas are stacked in a circuit board, an isolation may be lowered to −7 dB in the measurement frequency band (e.g., 50-65 GHz).

On the other hand, as can be seen from FIG. 17, the antenna devices 100 and 100' according to various embodiments of the present disclosure dispose the vertical polarization antenna 103 between the plurality of horizontal polarization antennas 102 and 102' to improve an isolation between the horizontal polarization antennas 102 and 102', thereby implementing more various types of polarization. Thus, the antenna devices 100 and 100' according to various embodiments of the present disclosure may generate polarization adaptively to a change in an radio wave environment, thus setting up stable communication connection.

Figure 19:
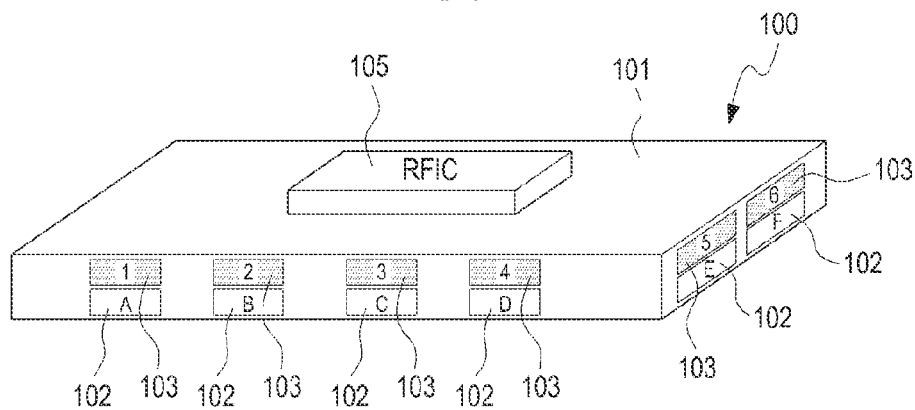
FIG. 19 illustrates an implementation example of an antenna device according to various embodiments of the present disclosure.

FIG. 19 illustrates an implementation example of the antenna device 100 according to various embodiments of the present disclosure.

The antenna device 100 illustrated in FIG. 19 is structured in which multiple combinations of the horizontal polarization antenna 102 and the vertical polarization antenna 103 are arranged along a circumference of the multi-layer circuit board 101. As stated above, a communication circuit chip 105 may be mounted on the multi-layer circuit board 101. As the communication circuit chip 105 is mounted together with the horizontal polarization antenna 102 and the vertical polarization antenna 103 on one multi-layer circuit board 101, a transmission loss between the communication circuit chip 105 and the horizontal polarization antenna 102 and the vertical polarization antenna 103 may be addressed. In the above-described structure of the antenna device 100, on/off of (e.g., application or non-application of a feed signal to) the horizontal polarization antenna 102 and the vertical polarization antenna 103 or polarization components of radio waves applied to the horizontal polarization antenna 102 or the vertical polarization antenna 103 are shown in Table 1.

TABLE 1

| | | Horizontal Polarization | Vertical Polarization | Circular Polarization | Inclined Polarization |
|---|---|---|---|---|---|
| 1 | On/Off | Off | On | On | On |
|   | Phase Difference | — | 0 | 0 | 0 |
| A | On/Off | On | Off | On | On |
|   | Phase Difference | 0 | — | 90 | 0 |
| 2 | On/Off | Off | On | On | On |
|   | Phase Difference | — | 0 | 0 | 0 |
| B | On/Off | On | Off | On | On |
|   | Phase Difference | 0 | — | 90 | 0 |
| 3 | On/Off | Off | On | On | On |
|   | Phase Difference | — | 0 | 0 | 0 |
| C | On/Off | On | Off | On | On |
|   | Phase Difference | 0 | — | 90 | 0 |
| 4 | On/Off | Off | On | On | On |
|   | Phase Difference | — | 0 | 0 | 0 |
| D | On/Off | On | Off | On | On |
|   | Phase Difference | 0 | — | 90 | 0 |

When inclined polarization is generated, in-phase feeding is performed to both the horizontal polarization antennas 102 and the vertical polarization antennas 103, but by turning off some of the horizontal polarization antennas 102 and the vertical polarization antennas 103, new inclined polarization having an inclination different from the foregoing inclined polarization may be generated. In addition, by turning on some of the horizontal polarization antennas 102 and the vertical polarization antennas 103 to generate particular polarization, a direction in which radiated radio waves of the antenna device 100 are directed may be changed variously.

In the antenna device 100, the horizontal polarization antennas 102 and the vertical polarization antennas 103 may generate and radiate different polarization in different directions. In addition, combinations of the horizontal polarization antennas 102 and the vertical polarization antennas 103 are arranged along the circumference of the multi-layer circuit board 101, and feed signals are applied to the combinations of the horizontal polarization antennas 102 and the vertical polarization antennas 103 sequentially or arbitrarily, thereby securing the omni-directivity of the antenna device 100.

Figure 20:
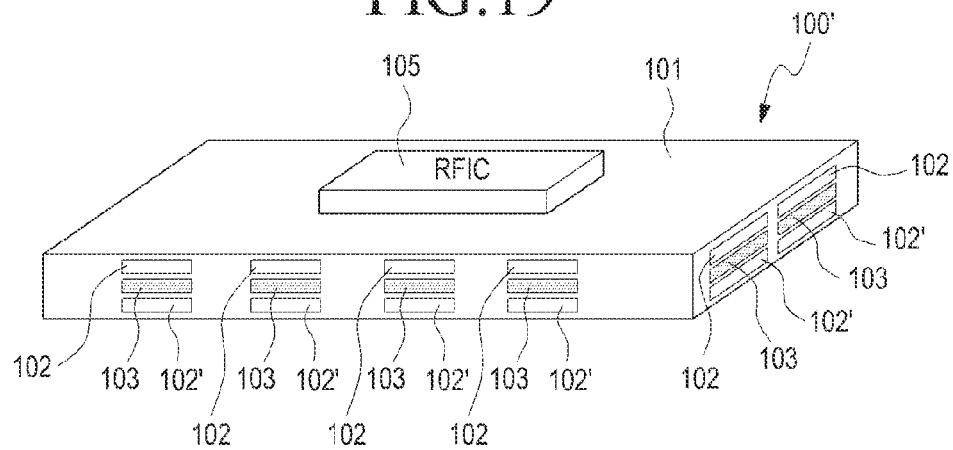
FIG. 20 illustrates another implementation example of an antenna device according to various embodiments of the present disclosure.
Figure 21:
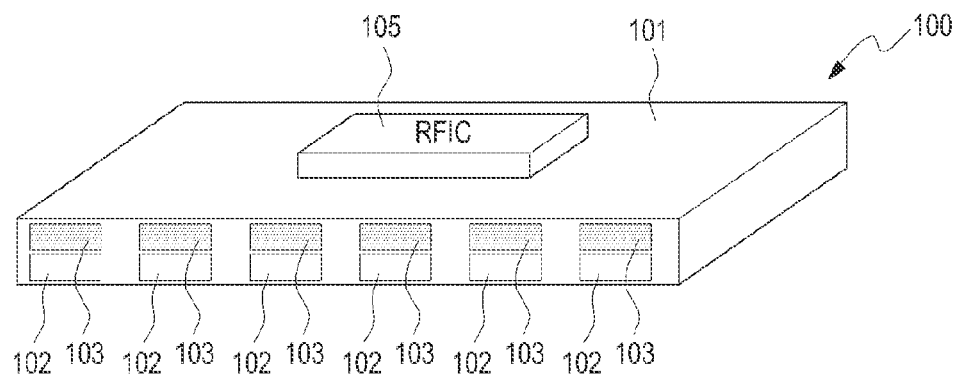
FIGS. 21 through 24 illustrate various implementation examples of an antenna device according to one of various embodiments of the present disclosure.
Figure 22:
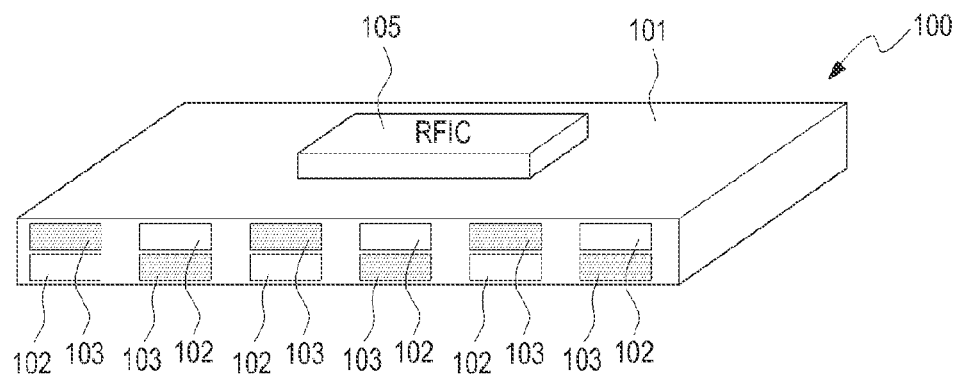

FIG. 20 illustrates another implementation example of the antenna device 100' according to various embodiments of the present disclosure.

Referring to FIG. 20, the antenna device 100' may be implemented by arranging combinations of the pair of horizontal polarization antennas 102 and 102' and the vertical polarization antenna 103 along the circumference of the multi-layer circuit board 101. The antenna device 100' according to the current embodiment of the present disclosure may also generate various forms of polarization according to application or non-application of feed signals to the horizontal polarization antennas 102 and 102' and the vertical polarization antenna 103 or according to a phase difference between the feed signals respectively applied to the horizontal polarization antennas 102 and 102' and the vertical polarization antenna 103.

FIGS. 21 through 24 illustrate various implementation examples of the antenna device 100 according to one of various embodiments of the present disclosure.

Figure 23:
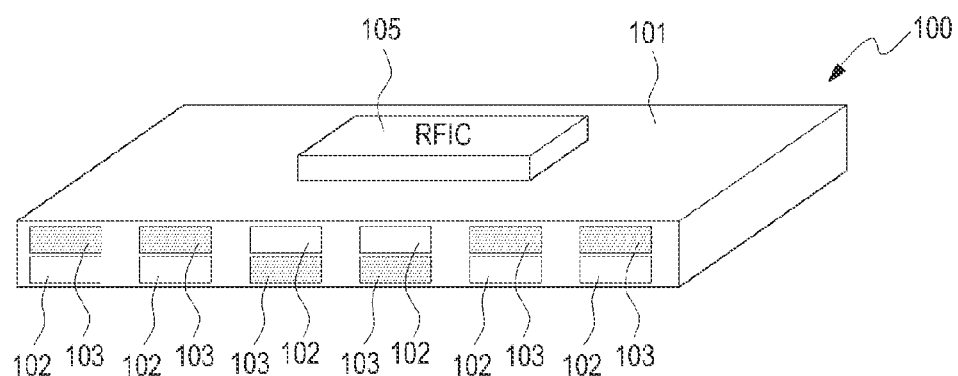
Figure 24:
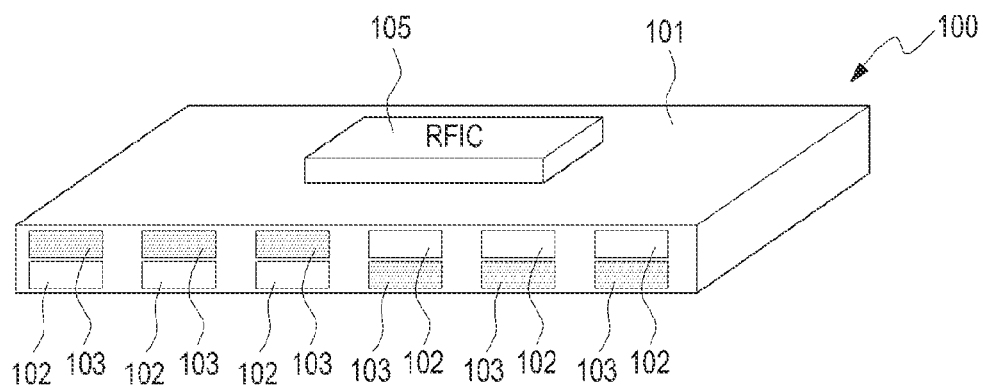

Although the vertical polarization antennas 103 are arranged above the horizontal polarization antennas 102 in the embodiment illustrated in FIG. 19, this arrangement may be implemented variously according to embodiments as illustrated in FIGS. 21 through 24. For example, referring to FIG. 22, the arrangement of the horizontal polarization antenna 102 and the vertical polarization antenna 103 may be sequentially reversed. In addition, as illustrated in FIGS. 23 and 24, in a certain section, the vertical polarization antenna 103 may be disposed above the horizontal polarization antenna 102, and in another section, the horizontal polarization antenna 102 may be disposed above the vertical polarization antenna 103.

Figure 25:
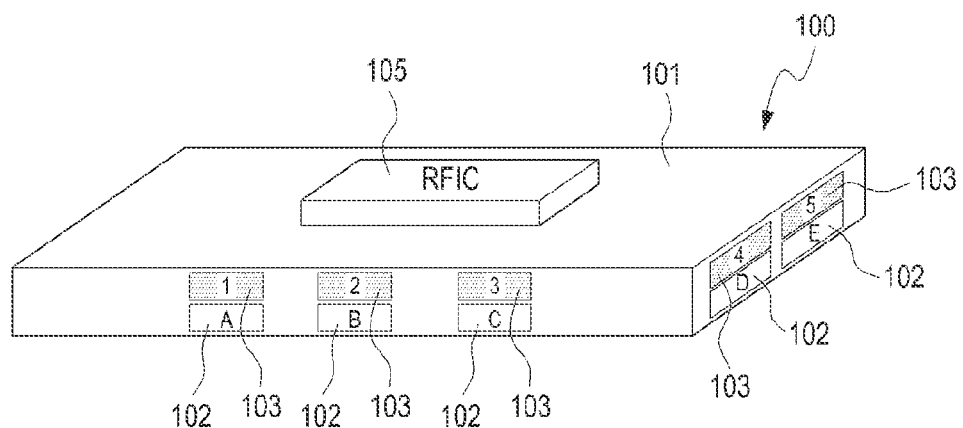
FIG. 25 illustrates an antenna device according to various embodiments of the present disclosure for describing a method for operating the antenna device.
Figure 26:
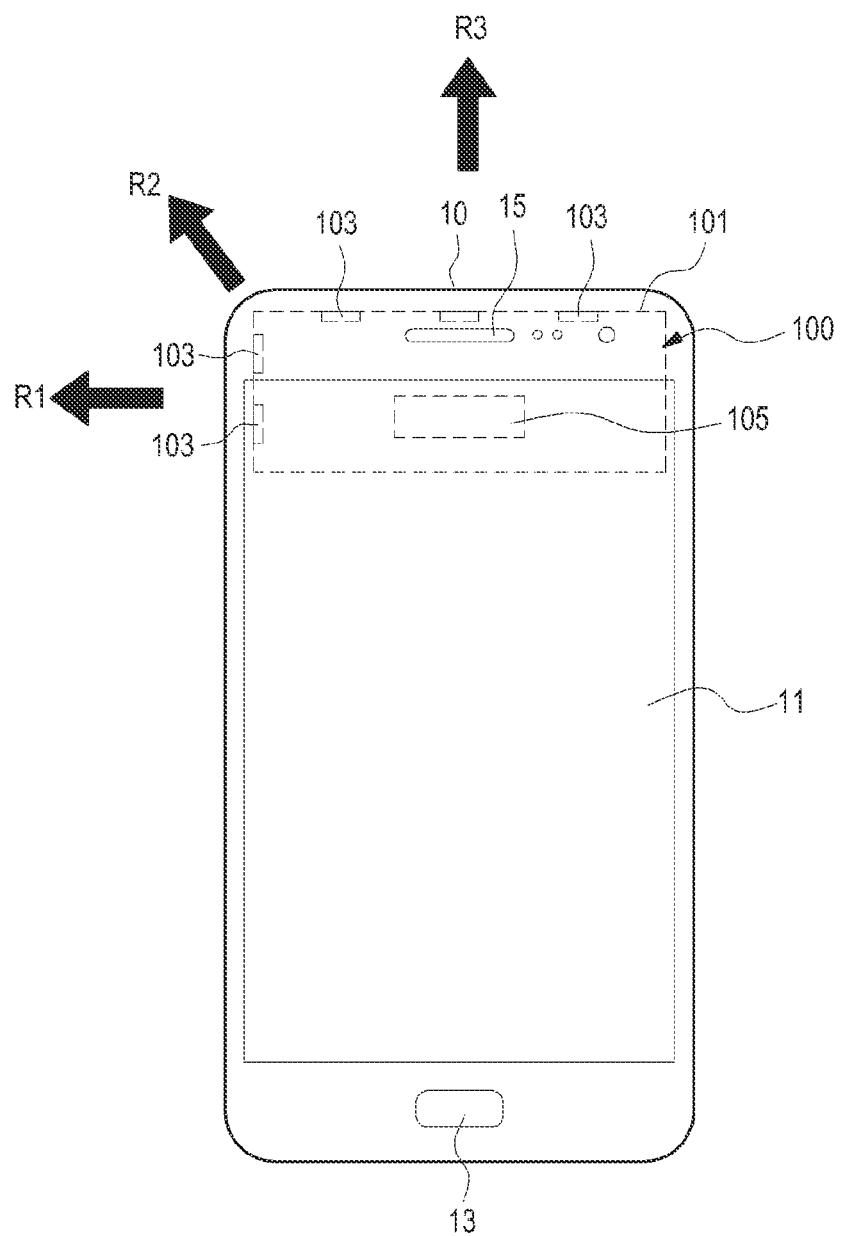
FIG. 26 illustrates an antenna device mounted on an electronic device according to various embodiments of the present disclosure.

FIG. 25 illustrate an antenna device according to various embodiments of the present disclosure for describing a method for operating the antenna device. FIG. 26 illustrates the antenna device 100 according to various embodiments of the present disclosure being mounted on an electronic device 10.

Referring to FIGS. 25 and 26, the antenna device 100 may be implemented by arranging combinations of the horizontal polarization antenna 102 and the vertical polarization antenna 103 along two adjacent sides of the multi-layer circuit board 101. The antenna device 100 structured as described above may generate various forms of polarization in various directions according to feed signals respectively applied to the horizontal polarization antennas 102 and the vertical polarization antennas 103. For example, when the antenna device 100 is mounted on the electronic device 10, the antenna device 100 may radiate radio waves in a side direction (hereinafter, referred to as a 'first direction R1') of the electronic device 10, an inclined direction (hereinafter, referred to as a 'second direction R2') with respect to the first direction R1, or an upward direction (hereinafter, referred to as a 'third direction R3'). If combinations of the horizontal polarization antenna 102 and the vertical polarization antenna 103 are disposed on another side of the multi-layer circuit board 101, radio waves may be radiated in other more directions (e.g., a reverse direction with respect to the first direction).

The electronic device 10 may output images or audio information by including a display 11 and a speaker module 15. The display 11 has a touch screen function mounted thereon to function as an input device and may include at least one physical key 13 or an input device, such as a microphone, that is not shown.

In the antenna device 100, generated radio waves and their radiation directions according to feed signals respectively applied to the horizontal polarization antenna 102 and the vertical polarization antenna 103 are shown in Table 2 through Table 4. In Table 2 through Table 4, '-' represents that no feed signal is applied to either the horizontal polarization antenna 102 or the vertical polarization antenna 103, and numbers, symbols, and equations mean a phase difference between applied feed signals.

First, Table 2 shows feed signals applied to the horizontal polarization antenna 102 and the vertical polarization antenna 103 when radio waves are radiated in the first direction R1.

TABLE 2

| | Horizontal Polarization | Vertical Polarization | Circular Polarization | Inclined Polarization |
|---|---|---|---|---|
| 1 | — | — | — | — |
| A | — | — | — | — |
| 2 | — | — | — | — |
| B | — | — | — | — |
| 3 | — | — | — | — |
| C | — | — | — | — |
| 4 | — | 0 | 0 | 0 |
| D | 0 | — | 90 | 0 |
| 5 | — | 0 | 0 | 0 |
| E | 0 | — | 90 | 0 |

In Table 2, inclined polarization may be generated by respectively feeding in-phase electricity to the horizontal polarization antenna 102 and the vertical polarization antenna 103, for example, 4, 5, D, and E, arranged on a side of the multi-layer circuit board 101. FIG. 25 is corrected. In this case, inclined polarization may be generally formed to be inclined at about 45° with respect to horizontal polarization or vertical polarization. In an embodiment, if electricity is not fed to one of the horizontal polarization antennas 102 (or the vertical polarization antennas 103), new inclined polarization having a different inclination with respect to horizontal polarization or vertical polarization may be generated.

Table 3 shows feed signals applied to the horizontal polarization antenna 102 and the vertical polarization antenna 103 when radio waves are radiated in the second direction R2.

TABLE 3

| | Horizontal Polarization | Vertical Polarization | Circular Polarization | Inclined Polarization |
|---|---|---|---|---|
| 1 | — | 0 | 0 | 0 |
| A | 0 | — | 90 | 0 |
| 2 | — | a | a | a |
| B | a | — | 90 + a | a |
| 3 | — | 2a | 2a | 2a |
| C | 2a | — | 90 + 2a | 2a |
| 4 | — | a + b | a + b | a + b |
| D | a + b | — | 90 + a + b | a + b |
| 5 | — | b | b | b |
| E | b | — | 90 + b | b |

In Table 3, a and b mean phase differences between feed signals respectively applied to the horizontal polarization antenna 102 and the vertical polarization antenna 103 in the antenna device 100. In Table 3, according to the phase differences a and b between the feed signals, the inclination of the second direction R2 with respect to the first direction R1 may be set variously.

Table 4 shows feed signals applied to the horizontal polarization antenna 102 and the vertical polarization antenna 103 when radio waves are radiated in the third direction R3.

TABLE 4

| | Horizontal Polarization | Vertical Polarization | Circular Polarization | Inclined Polarization |
|---|---|---|---|---|
| 1 | — | 0 | 0 | 0 |
| A | 0 | — | 90 | 0 |
| 2 | — | 0 | 0 | 0 |
| B | 0 | — | 90 | 0 |
| 3 | — | 0 | 0 | 0 |
| C | 0 | — | 90 | 0 |
| 4 | — | — | — | — |
| D | — | — | — | — |
| 5 | — | — | — | — |
| E | — | — | — | — |

As described above, an antenna device according to various embodiments of the present disclosure includes a horizontal polarization antenna implemented on a first layer in a multi-layer circuit board and a vertical polarization antenna implemented on a plurality of second layers that are different from the first layer in the multi-layer circuit board, in which the horizontal polarization antenna and the vertical polarization antenna are stacked spaced apart from each other at an edge of a side of the multi-layer circuit board.

According to various embodiments of the present disclosure, the vertical polarization antenna may include a radiation patch formed on a surface of one of the second layers, a ground patch formed on another surface of one of the second layers, and a via hole that is formed to pass through the second layer(s) and connects the radiation patch with the ground patch.

According to various embodiments of the present disclosure, the radiation patch may extend in a direction, and the ground patch may extend in parallel with the radiation patch and is longer than the radiation patch.

According to various embodiments of the present disclosure, the vertical polarization antenna may include at least a pair of induction patches that are formed on a surface of one of the second layers and extend in parallel with the radiation patch, at least a pair of second ground patches extending in parallel with the ground patch on another surface of one of the second layers, and a second via hole that is formed to pass through the second layer(s) and respectively connects the induction patch with the second ground patches.

According to various embodiments of the present disclosure, each of the induction patches may be shorter than the radiation patch, and a height between the induction patches and the second ground patches may be equal to or lower than a height between the radiation patch and the ground patch.

According to various embodiments of the present disclosure, radio waves may be radiated from the radiation patch in a direction in which the induction patch is arranged.

According to various embodiments of the present disclosure, the induction patch may be disposed in a position spaced apart from the radiation patch by a distance of a predetermined proportion, for example, ⅓, of a resonance frequency wavelength of the antenna device.

According to various embodiments of the present disclosure, the antenna device may further include an array of via holes, which is referred to as a via array, formed to pass through at least a part of the multi-layer circuit board, in which the radiation patch is positioned between the via array and the induction patch, and some of radio waves radiated from the radiation patch are reflected by the via array and are radiated from the radiation patch in a direction in which the induction patch is arranged.

According to various embodiments of the present disclosure, the via array may be disposed in a position spaced part from the radiation patch by a distance of a predetermined proportion, for example, ¼, of a resonance frequency wavelength of the antenna device.

According to various embodiments of the present disclosure, the vertical polarization antenna may include a reflection patch that is formed on a surface of one of the second layers and extends in parallel with the radiation patch, a third ground patch extending in parallel with the ground patch on another surface of one of the second layers, and a third via hole that is formed to pass through the second layer(s) and connects the induction patch with the third ground patch.

According to various embodiments of the present disclosure, the reflection patch may be longer than the radiation patch and a height between the reflection patch and the third ground patch may be higher than a height between the radiation patch and the ground patch.

According to various embodiments of the present disclosure, some of radio waves radiated from the radiation patch may be reflected by the reflection patch and may be radiated from the radiation patch in a direction in which the radiation patch is arranged.

According to various embodiments of the present disclosure, the reflection patch may be disposed in a position spaced part from the radiation patch by a distance of a predetermined proportion, for example, ¼, of a resonance frequency wavelength of the antenna device.

According to various embodiments of the present disclosure, the antenna device may further include a second horizontal polarization antenna implemented on a third layer that is different from the first layer and the second layer in the multi-layer circuit board, in which the vertical polarization antenna is disposed spaced apart from the second horizontal polarization antenna between the horizontal polarization antenna and the second horizontal polarization antenna.

According to various embodiments of the present disclosure, a plurality of combinations of the horizontal polarization antenna and the vertical polarization antenna that are stacked on each other may be arranged along a circumference of the multi-layer circuit board.

Hereinafter, a method for operating the antenna devices 100 and 100' according to various embodiments of the present disclosure will be described with reference to FIGS. 27 and 28.

Figure 27:
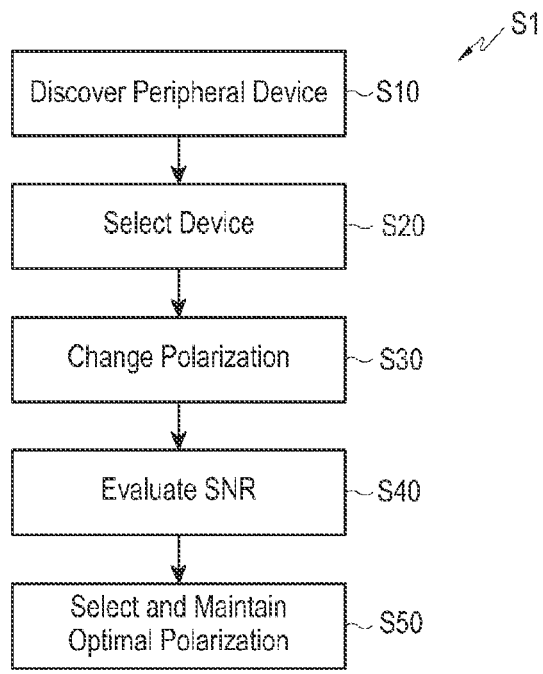
FIG. 27 is a flowchart of an example of a method for operating an antenna device according to various embodiments of the present disclosure.

FIG. 27 is a flowchart of a method for operating the antenna devices 100 and 100' according to various embodiments of the present disclosure. FIG. 28 is a flowchart of another example of the method for operating the antenna devices 100 and 100' according to various embodiments of the present disclosure.

The method for operating the antenna devices 100 and 100' according to various embodiments of the present disclosure may include a first method S1 for establishing communication connection with an initial peripheral device and a second method S2 for re-establishing and maintaining stable communication connection if transmission and reception sensitivity is degraded when the communication connection is established or if the communication connection is broken. The method may also operate the antenna devices 100 and 100' by combining the first method S1 and the second method S2.

Referring to FIG. 27, the first method S1 may include a discovery operation S10, a selection operation S20, a scan operation S30, an evaluation operation S40, and an establishment operation S50.

The search operation S10 discovers peripheral devices to which an electronic device having the antenna devices 100 and 100' mounted therein is to connect, and the peripheral devices may include another electronic device or a nearby mobile communication base station.

The selection operation S20 selects a device to which communication connection is to be made from among the discovered peripheral devices, and for example, if the electronic device 10 is to output audio, a nearby speaker device or earphone connectable through the antenna devices 100 and 100' may be selected. If the electronic device 10 is to output an image, the electronic device may select a monitor or a television connectable through the antenna devices 100 and 100'.

The scan operation S30 repetitively attempts communication with the selected peripheral device while changing polarization using a horizontal polarization antenna and a vertical polarization antenna. In the scan operation S30, different polarization may be generated using on/off of or a phase difference between feed signals applied to the horizontal polarization antennas 102 and the vertical polarization antennas 103 of the antenna device (e.g., the antenna devices 100, 100' of FIG. 1 and FIG. 2).

In the evaluation operation S40, polarization allowing better-quality communication is detected while the scan operation S30 is performed, in which the quality of communication with the selected peripheral device, for example, a signal-to-noise ratio, may be calculated based on the polarization generated by the antenna devices 100 and 100'.

In the establishment operation S50, the electronic device 10 selects and generates optimal polarization from among polarization that may be generated using the antenna devices 100 and 100', based on the evaluated communication quality, and establishes communication with the selected peripheral device.

Through this process, the antenna devices 100 and 100' may establish communication connection between the electronic device 10 and the peripheral device.

Meanwhile, if the antenna devices 100 and 100' are mounted on an electronic device used in an environment where an radio wave environment frequently changes, for example, on a mobile communication terminal, then a communication connection state, for example, transmission and reception sensitivity may be degraded or even communication may be broken according to a change in the radio wave environment. In this case, the communication connection with the selected peripheral device may be re-established and maintained using the second method S2.

Figure 28:
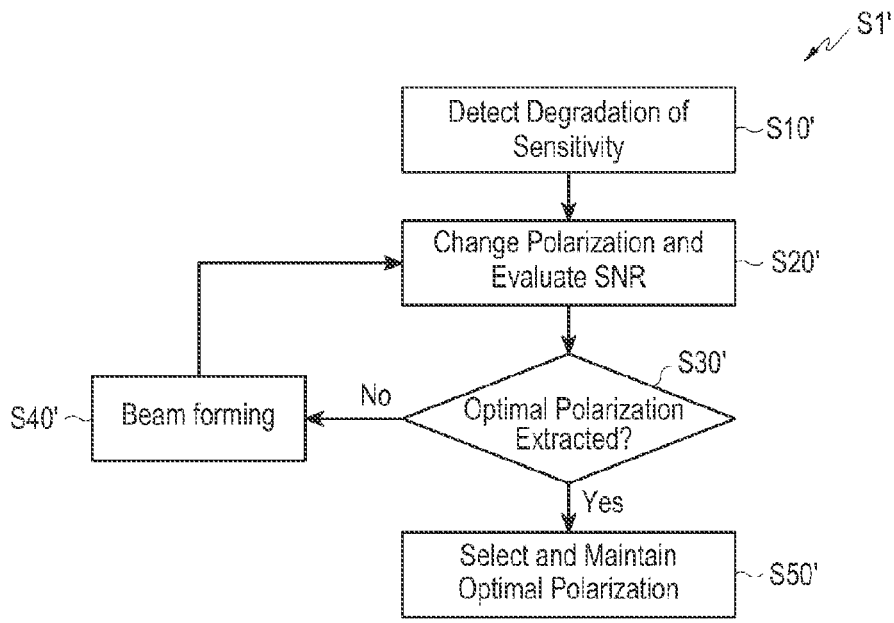
FIG. 28 is a flowchart of another example of a method for operating an antenna device according to various embodiments of the present disclosure.

Referring to FIG. 28, the second method S2 may include a sensitivity monitoring operation S10', a scan and evaluation operation S20', a decision operation S30', and a re-establishment operation S50'.

The sensitivity monitoring operation S10' monitors a communication state with the peripheral device, and detects stability of the communication connection from transmission and reception sensitivity with the peripheral device or a signal-to-noise ratio of a transmission or reception signal.

If remarkable degradation of transmission and reception sensitivity is detected in the sensitivity monitoring operation S10', the antenna devices 100 and 100' generate different various polarization and evaluate transmission and reception sensitivity or a signal-to-noise ratio according to each polarization while attempting communication with the peripheral device in the scan and evaluation operation S20'.

The decision operation S30' determines whether optimal polarization (polarization allowing stable communication connection) is extracted according to the evaluation result of the scan and evaluation operation S20', and if the optimal polarization is extracted, communication with the peripheral device may be re-established and maintained using the optimal polarization in the re-establishment operation S50'. If proper polarization is not extracted in the decision operation S30', the scan and evaluation operation S20' and the decision operation S30' may be repeated in operation S40' until the optimal polarization is extracted.

According to various embodiments of the present disclosure, the second method S2 may be implemented by performing the scan operation S30, the evaluation operation S40, and the establishment operation S50 of the first method S1 again if degradation of transmission and reception sensitivity is detected in the sensitivity monitoring operation S10'.

As described above, a method for operating an antenna device including a combination of a horizontal polarization antenna and a vertical polarization antenna according to various embodiments of the present disclosure may include a discovery operation of discovering a peripheral device (e.g., the step S10 of FIG. 27), a selection operation of selecting a peripheral device to which communication connection is to be made from among discovered peripheral devices (e.g., the step S20 of FIG. 27), a scan operation of attempting communication with the selected peripheral device while changing polarization using the horizontal polarization antenna and the vertical polarization antenna (e.g., the step S30 of FIG. 27), an evaluation operation of evaluating a signal-to-noise ratio corresponding to polarization in the communication with the selected peripheral device (e.g., the step S40 of FIG. 27), and an establishment operation of selecting optimal polarization from the evaluated signal-to-noise ratio and establishing communication (e.g., the step S50 of FIG. 27).

According to various embodiments of the present disclosure, a plurality of combinations of the horizontal polarization antenna and the vertical polarization antenna may be arranged along a circumference of a multi-layer circuit board, and the scan operation may include generating different polarization using on/off of or a phase difference between feed signals respectively applied to the horizontal polarization antenna and the vertical polarization antenna to attempt the communication with the selected peripheral device.

According to various embodiments of the present disclosure, if communication sensitivity is degraded after the establishment operation, the scan operation, the evaluation operation, and the establishment operation may be performed again.

According to various embodiments of the present disclosure, the antenna device may include at least a pair of horizontal polarization antennas between which the vertical polarization antenna is disposed, and the scan operation may include generating different polarization using on/off of or a phase difference between feed signals respectively applied to the horizontal polarization antennas and the vertical polarization antenna to attempt the communication with the selected peripheral device.

As is apparent from the foregoing description, an antenna device according to various embodiments of the present disclosure forms a vertical polarization antenna in a multi-layer circuit board by using a 0-degree mode resonator, making it easy to secure a polarization component (e.g., the vertical polarization component) in a thickness direction of the multi-layer circuit board. In addition, by implementing a radiator including a combination of the vertical polarization antenna and the horizontal polarization antenna, various forms of polarization such as circular polarization as well as vertical/horizontal polarization, thereby stably maintaining transmission and reception sensitivity with a peripheral device. Moreover, the antenna device according to various embodiments of the present disclosure may secure omni-directivity by arranging a radiator including a combination of the vertical polarization antenna and the horizontal polarization antenna to secure omni-directivity, and when mounted on an electronic device used in a frequently changing radio wave environment, such as a mobile communication terminal, the antenna device may provide stable communication. When the radiator including the combination of the vertical polarization antenna and the horizontal polarization antenna is implemented, the antenna device disposes the vertical polarization antenna between a pair of horizontal polarization antennas to improve an isolation between the horizontal polarization antennas, thus further improving the performance of the antenna device.

While the present disclosure has been particularly illustrated and described with reference to exemplary embodiments thereof, various modifications or changes can be made without departing from the scope of the present disclosure.

What is claimed is:

1. An antenna device comprising:
    a multi-layer circuit board having a surface, a first layer and a plurality of second layers that are different from the first layer;
    a horizontal polarization antenna implemented on the first layer in the multi-layer circuit board and configured to generate a polarization in a first direction relative to the surface of the multi-layer circuit board; and
    a vertical polarization antenna implemented on the plurality of second layers and configured to generate an electric field in a second direction relative to the surface of the multi-layer circuit board, and
    wherein the horizontal polarization antenna and the vertical polarization antenna are stacked spaced apart from each other at a side of the multi-layer circuit board, and
    wherein the vertical polarization antenna comprises:
        a radiation patch formed on a surface of one of the second layers;
        a ground patch formed on another surface of one of the second layers; and
        a via hole that is formed to pass through at least one of the second layers and electrically connects the radiation patch with the ground patch.

2. The antenna device of claim 1, wherein the radiation patch extends in a direction, and the ground patch extends in parallel with the radiation patch and is longer than the radiation patch.

3. The antenna device of claim 1, wherein the vertical polarization antenna comprises:
    at least a pair of induction patches that are formed on a surface of one of the second layers and extend in parallel with the radiation patch;
    at least a pair of second ground patches extending in parallel with the ground patch on another surface of one of the second layers; and
    a second via hole that is formed to pass through at least one of the second layers and respectively connects the induction patch with the second ground patches.

4. The antenna device of claim 3, wherein each of the induction patches is shorter than the radiation patch, and a height between the induction patches and the second ground patches is equal to or lower than a height between the radiation patch and the ground patch.

5. The antenna device of claim 3, wherein radio waves are radiated from the radiation patch in a direction in which the induction patch is arranged.

6. The antenna device of claim 3, wherein the induction patch is disposed in a position spaced apart from the radiation patch by a distance of ⅓ of a resonance frequency wavelength of the antenna device.

7. The antenna device of claim 3, further comprising an array of via holes, which is referred to as a via array, formed to pass through at least a part of the multi-layer circuit board,
    wherein the radiation patch is positioned between the via array and the induction patch, and some of radio waves radiated from the radiation patch are reflected by the via array and are radiated from the radiation patch in a direction in which the induction patch is arranged.

8. The antenna device of claim 7, wherein the via array is disposed in a position spaced apart from the radiation patch by a distance of ¼ of a resonance frequency wavelength of the antenna device.

9. The antenna device of claim 1, wherein the vertical polarization antenna comprises:
    a reflection patch that is formed on a surface of one of the second layers and extends in parallel with the radiation patch;
    a third ground patch extending in parallel with the ground patch on another surface of one of the second layers; and
    a third via hole that is formed to pass through at least one of the second layers and connects the reflection patch with the third ground patch.

10. The antenna device of claim 9, wherein the reflection patch is longer than the radiation patch and a height between the reflection patch and the third ground patch is higher than a height between the radiation patch and the ground patch.

11. The antenna device of claim 9, wherein some of radio waves radiated from the radiation patch are reflected by the reflection patch and are radiated from the radiation patch in a direction in which the radiation patch is arranged.

12. The antenna device of claim 9, wherein the reflection patch is disposed in a position spaced part from the radiation patch by a distance of ¼ of a resonance frequency wavelength of the antenna device.

13. The antenna device of claim 1, further comprising a second horizontal polarization antenna implemented on a third layer that is different from the first layer and the second layer in the multi-layer circuit board,
    wherein the vertical polarization antenna is disposed spaced apart from the second horizontal polarization antenna between the horizontal polarization antenna and the second horizontal polarization antenna.

14. The antenna device of claim 1, wherein a plurality of combinations of the horizontal polarization antenna and the vertical polarization antenna that are stacked on each other are arranged along a circumference of the multi-layer circuit board.

* * * * *